(12) United States Patent
Han et al.

(10) Patent No.: US 11,258,054 B2
(45) Date of Patent: Feb. 22, 2022

(54) POSITIVE ELECTRODE ACTIVE MATERIAL COMPRISING LITHIUM-RICH LITHIUM MANGANESE-BASED OXIDE IN WHICH COATING LAYER INCLUDING LITHIUM-DEFICIENT TRANSITION METAL OXIDE IS FORMED, AND POSITIVE ELECTRODE FOR LITHIUM SECONDARY BATTERY COMPRISING THE SAME

(71) Applicant: LG Chem, Ltd., Seoul (KR)

(72) Inventors: Gi Beom Han, Daejeon (KR); Min Kyu You, Daejeon (KR); Chi Ho Jo, Daejeon (KR); Jintae Hwang, Daejeon (KR); Wang Mo Jung, Daejeon (KR); Sungbin Park, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/489,922

(22) PCT Filed: Sep. 7, 2018

(86) PCT No.: PCT/KR2018/010471
§ 371 (c)(1),
(2) Date: Aug. 29, 2019

(87) PCT Pub. No.: WO2019/083157
PCT Pub. Date: May 2, 2019

(65) Prior Publication Data
US 2020/0083522 A1    Mar. 12, 2020

(30) Foreign Application Priority Data

Oct. 26, 2017    (KR) .................. 10-2017-0140282
Aug. 20, 2018    (KR) .................. 10-2018-0096965

(51) Int. Cl.
*H01M 4/131*    (2010.01)
*H01M 4/505*    (2010.01)
(Continued)

(52) U.S. Cl.
CPC ........... *H01M 4/131* (2013.01); *H01M 4/505* (2013.01); *H01M 4/525* (2013.01); *H01M 10/0525* (2013.01); *H01M 2004/028* (2013.01)

(58) Field of Classification Search
CPC ...... H01M 4/131; H01M 4/505; H01M 4/525; H01M 10/0525; H01M 2004/028
See application file for complete search history.

(56) References Cited

U.S. PATENT DOCUMENTS 9,236,609 B2    1/2016   Park et al.
9,246,166 B2    1/2016   Lee et al.
(Continued)

FOREIGN PATENT DOCUMENTS

CN    103687813 A    3/2014
CN    106797029 A    5/2017
(Continued)

OTHER PUBLICATIONS

Search report from International Application No. PCT/KR2018/010471, dated Feb. 28, 2019.
(Continued)

*Primary Examiner* — Jimmy Vo
(74) *Attorney, Agent, or Firm* — Lerner, David, Littenberg, Krumholz & Mentlik, LLP (57) ABSTRACT

A positive electrode active material contains a lithium-rich lithium manganese-based oxide represented by chemical formula (1), $$Li_{1+a}Ni_xCo_yMn_zM_vO_{2-b}A_b \quad (1)$$

wherein, $0<a\leq0.2$, $0<x\leq0.4$, $0<y\leq0.4$, $0.5\leq z\leq0.9$, $0\leq v\leq0.2$, $a+x+y+z+v=1$, and $0\leq b\leq0.5$;
(Continued)

M is one or more elements selected from the group consisting of Al, Zr, Zn, Ti, Mg, Ga, In, Ru, Nb, and Sn; and A is one or more elements selected from the group consisting of P, N, F, S and Cl; and a coating layer formed on a surface of the lithium-rich lithium manganese-based oxide, wherein the coating layer contains a lithium-deficient transition metal oxide in a lithium-deficient state having a molar ratio of lithium to transition metal of less than 1 is formed on the surface of the lithium-rich lithium manganese-based oxide, and wherein the content of the coating layer is 1% to 10% by weight based on the total weight of the positive electrode active material.

9 Claims, 4 Drawing Sheets

(51) Int. Cl.
  *H01M 4/525* (2010.01)
  *H01M 10/0525* (2010.01)
  *H01M 4/02* (2006.01)

(56) References Cited

U.S. PATENT DOCUMENTS

| | | |
|---|---|---|
| 9,525,173 B2 | 12/2016 | Kagei et al. |
| 10,217,997 B2 | 2/2019 | Hah et al. |
| 2003/0018794 A1 | 1/2003 | Zhang et al. |
| 2003/0108794 A1 | 6/2003 | Park et al. |
| 2007/0122338 A1 | 5/2007 | Park et al. |
| 2014/0065483 A1 | 3/2014 | Park et al. |
| 2014/0087263 A1 | 3/2014 | Matsumoto et al. |
| 2014/0131617 A1 | 5/2014 | Park et al. |
| 2014/0154555 A1 | 6/2014 | Endoh et al. |
| 2014/0205898 A1 | 7/2014 | Lee et al. |
| 2015/0104708 A1* | 4/2015 | Bi .................. H01M 4/505 429/220 |
| 2016/0254539 A1 | 9/2016 | Kagei et al. |
| 2017/0084915 A1 | 3/2017 | Hah et al. |
| 2017/0155147 A1 | 6/2017 | Nishimura et al. |
| 2017/0187035 A1 | 6/2017 | Yanagihara et al. |
| 2017/0309910 A1 | 10/2017 | Jo et al. |

FOREIGN PATENT DOCUMENTS

| | | |
|---|---|---|
| JP | 2002260659 A | 9/2002 |
| JP | 2004519825 A | 7/2004 |
| JP | 2007287569 A | 11/2007 |
| JP | 2013206558 A | 10/2013 |
| JP | 2014112476 A | 6/2014 |
| JP | 2015099646 A | 5/2015 |
| JP | 2015130273 A | 7/2015 |
| JP | 2016033901 A | 3/2016 |
| JP | 2017100892 A | 6/2017 |
| KR | 101127554 B1 | 3/2012 |
| KR | 20140031018 A | 3/2014 |
| KR | 20140073856 A | 6/2014 |
| KR | 20140093529 A | 7/2014 |
| KR | 101470092 B1 | 12/2014 |
| KR | 20150065979 A | 6/2015 |
| KR | 20150085414 A | 7/2015 |
| KR | 20150108761 A | 9/2015 |
| KR | 101613862 B1 | 4/2016 |
| KR | 20160039983 A | 4/2016 |
| KR | 20160123164 A | 10/2016 |
| WO | 2012165654 A1 | 12/2012 |

OTHER PUBLICATIONS

Wu, Feng, et al., "Stable Nanostructured Cathode with Polycrystalline Li-Deficient Li0.28Co0.29Ni0.30Mn0.2O2 for Lithium-Ion Batteries." Nano Letters (Revised: Feb. 5, 2014; Published: Feb. 14, 2014), vol. 14, pp. 1281-1287.

Bruce P G et al., "New Intercalation Compounds for Lithium Batteries: Layered LIMNO2", Journal of Materials Chemistry, Royal Society of Chemistry, Jan. 1, 1999, vol. 9, No. 1, pp. 193-198, XP000828945.

Extended European Search Report including Written Opinion for Application No. EP18870988.5 dated Mar. 17, 2020, 8 pages.

Chinese Search Report for Application No. 201880015875.5, dated Nov. 8, 2021, 3 pages.

* cited by examiner

ively inexpensive, and makes it possible for a battery to have high discharge capacity. However, phase transition abruptly occurs in the crystal structure depending on the change in volume of the battery caused by charge-discharge cycle. In addition, when $LiNiO_2$ is exposed to air and moisture, the safety of $LiNiO_2$ is abruptly lowered.

POSITIVE ELECTRODE ACTIVE MATERIAL COMPRISING LITHIUM-RICH LITHIUM MANGANESE-BASED OXIDE IN WHICH COATING LAYER INCLUDING LITHIUM-DEFICIENT TRANSITION METAL OXIDE IS FORMED, AND POSITIVE ELECTRODE FOR LITHIUM SECONDARY BATTERY COMPRISING THE SAME

CROSS-REFERENCE TO RELATED APPLICATION(S)

The present application is a national phase entry under 35 U.S.C. § 371 of International Application No. PCT/KR2018/010471 filed Sep. 7, 2018, which claims priority from Korean Patent Application No. 10-2017-0140282 filed with Korean Intellectual Property Office on Oct. 26, 2017, and Korean Patent Application No. 10-2018-0096965 filed with Korean Intellectual Property Office on Aug. 20, 2018, the entire contents of which are incorporated herein by reference.

TECHNICAL FIELD

The present invention relates to a positive electrode active material comprising a lithium-rich lithium manganese-based oxide in which a coating layer including a lithium-deficient transition metal oxide is formed, and a positive electrode for a lithium secondary battery comprising the same.

BACKGROUND ART

In accordance with technological development and increased demand for mobile devices, demand for using secondary batteries as energy sources has rapidly increased. Among these secondary batteries, lithium secondary batteries having high energy density and operating potential, long cycle life, and low self-discharge ratio are commercially available and widely used.

Also, in line with growing concerns about environmental issues, a great deal of research associated with electric vehicles and hybrid electric vehicles which are capable of substituting for vehicles using fossil fuels such as gasoline vehicles and diesel vehicles, which are one of major causes of air pollution, have been conducted. Although nickel-metal hydride secondary batteries have mainly been used as power sources for such electric vehicles and hybrid electric vehicles, a great deal of research has also been carried out into lithium secondary batteries having high energy density, high discharge voltage, long cycle life, and low self-discharge rate, and some of the lithium secondary batteries are commercially available.

Carbon materials are mainly used for a negative electrode active material of these lithium secondary batteries, and the use of lithium metal, sulfur compounds and the like are also under consideration. Moreover, lithium-containing cobalt oxide ($LiCoO_2$) is mainly used for a positive electrode active material and, in addition, the uses of lithium-containing manganese oxides, such as $LiMnO_2$ having a layered crystal structure and $LiMn_2O_4$ having a spinel crystal structure, and lithium-containing nickel oxides ($LiNiO_2$) are also under consideration.

Among the above-mentioned positive electrode active materials, $LiCoO_2$ is most commonly used due to its excellent lifetime characteristics and high charge-discharge efficiency, but has low structural stability. In addition, due to the resource limitations of cobalt, which is a raw material, $LiCoO_2$ is expensive, and therefore price competitiveness is low, whereby the massive use thereof as power sources in fields such as electric vehicles is limited.

$LiNiO_2$ based positive electrode active materials are relatively inexpensive, and makes it possible for a battery to have high discharge capacity. However, phase transition abruptly occurs in the crystal structure depending on the change in volume of the battery caused by charge-discharge cycle. In addition, when $LiNiO_2$ is exposed to air and moisture, the safety of $LiNiO_2$ is abruptly lowered.

In addition, lithium manganese oxides such as $LiMnO_2$, $LiMn_2O_4$, etc. have merits of excellent thermal safety and low price but entail disadvantages such as low capacity, poor cycle life characteristics, poor high-temperature characteristics, etc.

In this regard, for a lithium transition metal oxide containing a high content of Mn, an attempt has been made to use an oxide containing excessive lithium wherein the content of lithium is higher than the content of the transition metal such that a high capacity of 270 or more mAh/g is exhibited at a high voltage of 4.5 V or higher.

The oxide containing excessive lithium has a composition limit that rate characteristics are low, and thus controls the structure in such a direction as to improve the rate characteristics by making the primary particles smaller and making the BET of the secondary particles larger. However, control of such a structure causes a problem that the surface is rough and the press density is lowered.

Moreover, in the oxide containing excessive lithium, in addition to lithium, oxygen escapes from the active material structure at the time of high-voltage activation to utilize excessive lithium. As a result, it has been found that the active material structure may collapse, a voltage sagging phenomenon resulting therefrom may occur, the deterioration of the battery cell may be accelerated, an increase of the resistance and generation of gas and the like may be caused due to decomposition of the electrolyte according to high-voltage driving, thereby further accelerating deterioration of the battery cell.

In order to solve these problems, conventionally, attempts have been made to coat a metal oxide onto the surface of these positive electrode active materials to thereby enhance the surface stability. However, in this case, not only the electrical conductivity and the ionic conductivity are lowered by the coated metal oxide to deteriorate the battery performance, but also with the decrease of the mass of the active material due to the increase of the mass of the coating layer, there was no choice but to accept the damage of the volume side Therefore, positive electrode active material technologies having excellent battery cell performance while solving the problems of the oxide containing excessive lithium are highly required.

DETAILED DESCRIPTION OF THE INVENTION

Technical Problem

The present invention has been made to solve the problems of conventional techniques and other technical problems that have yet to be resolved.

As a result of a variety of extensive and intensive studies and experiments to solve the problems described above, the present inventors have found that as will be described later, when using a positive electrode active material in which a coating layer containing a lithium-deficient transition metal oxide in a lithium-deficient state having a molar ratio of lithium to transition metal of less than 1 is formed on the surface of the lithium-rich lithium manganese-based oxide (having a composition of Mn of 0.5 or more), the desired effects can be exhibited. The present invention has been completed based on these findings.

Technical Solution

Therefore, the positive electrode active material according to the present invention is a positive electrode active material including a lithium-rich lithium manganese-based oxide, wherein the lithium-rich lithium manganese-based oxide is represented by the following chemical formula (1), (1)

wherein, $0<a\le0.2$, $0<x\le0.4$, $0<y\le0.4$, $0.5\le z\le0.9$, $0\le v\le0.2$, $a+x+y+z+v=1$, and $0\le b\le0.5$;

M is one or more elements selected from the group consisting of Al, Zr, Zn, Ti, Mg, Ga, In, Ru, Nb, and Sn; and A is one or more elements selected from the group consisting of P, N, F, S and Cl;

wherein a coating layer containing a lithium-deficient transition metal oxide in a lithium-deficient state having a molar ratio of lithium to transition metal of less than 1 is formed on the surface of the lithium-rich lithium manganese-based oxide, and wherein the content of the coating layer is 1% to 10% by weight based on the total weight of the positive electrode active material.

Specifically, in order to exhibit a higher capacity under a high voltage, $0<x\le0.2$, $0<y\le0.2$, $0.6\le z\le0.9$, and $0\le v\le0.1$.

Generally, as the lithium-rich lithium manganese-based oxide, an active material having 50 mol % or more of Mn has been actively developed as high-voltage and high-capacity materials for realizing a high energy density, as described above. However, the active material causes a side reaction due to high-voltage driving, which leads to an increase in resistance of the positive electrode active material, an increase in resistance due to the decomposition of the electrolyte, a generation of gas, and the like, thereby further promoting deterioration of the battery cell. Thus, it is necessary to introduce a coating layer on the surface of the positive electrode active material.

In this connection, active materials other than the above-mentioned composition also have the above-mentioned problems during high voltage driving, and thus attempts have been made to introduce a coating layer of a metal oxide such as $Al_2O_3$ or $WO_3$. However, the positive electrode active material according to the present invention is a lithium manganese-based oxide having Mn of 50 mol % or more, and there is an additional problem that low press density and rate characteristics are limited in the realization of energy density. The rate characteristics are rather further reduced by the metal oxide coating as described above, and there has still been a problem that the cell performance other than surface protection is poor.

In addition, in the active material according to the present invention, solving the problem of low press density is essential for realizing high energy density. However, in general, in the case of forming a coating layer of a lithium transition metal oxide on a positive electrode active material, the press density is lowered even though the effect of improving the performance of other battery cells can be achieved. It has been only applied to a limited active material, which has excellent press density as such. Such attempts have been difficult in lithium-rich lithium manganese-based oxides where it is difficult to obtain the desired degree of press density as described above.

Moreover, when a lithium metal oxide composed of elements other than Ni, Mn, and Co is coated onto a positive electrode active material, there is a problem that the capacity is lowered due to the decrease of the active material caused by the increase in the weight of the coating layer. When a general lithium transition metal oxide having a molar ratio of lithium to transition metal of 1 is coated, there is a problem that the charge/discharge rate characteristic is deteriorated because movement of lithium is not smooth.

In this regard, the present inventors have conducted extensive and intensive researches, and have found that when a coating layer containing a lithium-deficient transition metal oxide having a molar ratio of lithium to transition metal of less than 1 is formed on the surface of the lithium-rich lithium manganese-based oxide according to the present invention, not only the surface protection property achieved by the coating is improved, but also the problem of the reduction of the press density and rate characteristics as characteristic defects appearing in the lithium-rich lithium manganese-based oxide is solved, making it possible to realize a high energy density, thereby completing the present invention.

That is, in general, unlike other active materials where the press density is rather reduced by the coating of lithium transition metal oxide, in the lithium-rich lithium manganese-based oxide according to the present invention, it was found that the press density is improved by introducing the coating layer in the form of the lithium transition metal oxide, and at the same time the rate characteristics are also improved by making lithium deficient.

Therefore, the lithium-deficient transition metal oxide formed on the surface of the lithium-rich lithium manganese oxide according to the present invention can be a material represented by the following chemical formula (2).

(2)

wherein, $0<a'<1$,

Me may be two or more elements selected from the group consisting of Ni, Co, and Mn, specifically, $Me=Ni_{x'}Co_{y'}Mn_{z'}$ (wherein, $0<x'\le1$, $0<y'\le1$, $0<z'\le1$, and $x'+y'+z'=1$), more specifically, in the above formula, $0<x'\le0.7$, $0<y'\le0.7$, and $0.2<z'\le0.6$.

In this way, when the coating layer contains Ni, Mn, and Co, the coating layer can also act as an active material. Thus, not only a substantial decrease in the weight of the active material due to the increase in the weight of the coating layer is small, but also it has the effect of improving the electrical conductivity. When lithium is deficient, there is an effect that the movement of lithium is smooth and the rate characteristics are improved, as described above, and, therefore, it is desirable to have the above-mentioned composition.

Further, when the coating layer contains all of Ni, Mn and Co, it is more preferable because it is advantageous for improving the structural stability and thermal stability as compared with the case where each composition is present alone.

Further, the molar ratio of lithium to transition metal in the lithium-deficient transition metal oxide may be specifically 0.5 to 0.9, more specifically 0.7 to 0.9.

When the molar ratio of lithium is reduced to less than 0.5 beyond the above range, there is a problem that a Li-free metal oxide ($Me_sO_t$) structure is formed, which may interfere with the movement of lithium ions. When the above range is satisfied, the most excellent rate characteristic is exhibited.

At this time, the content of the coating layer may be 1% to 10% by weight, and more specifically, 3% to 7% by weight based on the total weight of the positive electrode active material.

In addition, the thickness of the coating layer contained as described above may be 30 nm to 200 nm, and more specifically, 30 nm to 150 nm. This can be measured based on a TEM photograph.

When the content of the coating layer exceeds 10% by weight and the thickness exceeds 200 nm, deviating from the above range, the coating layer may rather act as a resistance, exhibiting an increase in the capacity reduction and a decrease in the rate characteristic. When the content is less than 1% by weight and the thickness is too low, less than 30 nm, the surface protection characteristic of the positive electrode active material can not be exhibited and the effect of improving the press density is also lowered, which is not preferable.

Since the lithium-rich lithium manganese-based oxide generally has an average particle diameter ($D_{50}$) of 1 µm to 50 µm, the thickness of the coating layer accounts for 0.06 to 20% relative to the particle diameter of lithium-rich lithium manganese-based oxide.

The average particle diameter ($D_{50}$) is defined as a particle diameter based on 50% of the particle diameter distribution, and for example, it can be measured using a laser diffraction method.

Further, another embodiment of the present invention provides a method for producing the above-mentioned positive electrode active material, the method comprising the steps of:

(i) mixing a lithium-rich transition metal oxide and a lithium-deficient transition metal oxide in a lithium-deficient state having a molar ratio of lithium to transition metal of less than 1; and (ii) heat treating the mixture of step (i);

wherein the lithium-deficient transition metal oxide may be mixed so as to contained in an amount of 1% to 10% by weight based on the total weight of the lithium-rich lithium manganese-based oxide and the lithium-deficient transition metal oxide.

At this time, the lithium-deficient transition metal oxide for forming the desired amount of the coating layer may be mixed so as to contained preferably in an amount of 3% to 7% by weight, based on the total weight of the lithium-rich lithium manganese-based oxide and the lithium-deficient transition metal oxide.

The mixing of the above step (i) is a conventionally known technique. Although it is not limited to a known method, but specifically, it may be a dry mixing method, and more particularly, it may be performed by a ball mill method.

Here, the average particle diameter ($D_{50}$) of the mixed lithium-deficient transition metal oxide may be 0.05 µm to 1 µm.

Therefore, by the above mixing, the lithium-deficient transition metal oxide can be first attached in the form of particles to the surface of lithium-rich lithium manganese-based oxide.

The mixture thus formed can be strongly bonded in the form of particles by heat treatment, or the lithium-deficient transition metal oxide can be modified in the form of a film. Consequently, the space between the lithium-rich lithium manganese-based oxide particles can be filled. At this time, the heat treatment may be performed at 600 to 1100 degrees Celsius and may be performed for 5 to 12 hours.

When the heat treatment temperature is too low, deviating from the above range, a coating layer may not be formed sufficiently, and when the heat treatment temperature is too high, the lithium-rich lithium manganese-based oxide and the lithium-deficient transition metal oxide constituting the positive electrode active material particles are completely reacted and used, making it possible to change the physical and chemical properties of the positive electrode active material, which is not preferable.

Alternatively, a method for producing the positive electrode active material according to the present invention comprises the steps of:

(a) coating a transition metal precursor onto the surface of the lithium-rich lithium manganese-based oxide in the form of particles;

(b) further adding a lithium source material to the lithium manganese-based oxide coated with the transition metal precursor and mixing them; and (c) heat treating the mixture of step (b);

wherein the amount of the lithium source material to be added in step (b) is determined in a range where the ratio of moles of lithium relative to total moles of transition metal of the transition metal precursor is less than 1.

In this case, the transition metal precursor and the lithium source may be introduced so that the coating layer in the resulting configuration satisfies the above-mentioned content.

The transition metal precursor coated on the surface of the lithium manganese-based oxide may be two or more elements selected from the group consisting of Ni, Mn, and Co, specifically, a hydroxide including all of the above materials.

This may be formed by a coprecipitation method in which transition metal sources are coprecipitated in a solvent on the surface of the lithium manganese-based oxide, or the transition metal precursors produced by the coprecipitation method can also be formed by a dry method such as a ball mill mixing.

Similarly, the mixing of the lithium source material of step (b) may also be performed by a wet or dry method so as to be performed continuously with step (a).

At this time, the lithium source material may be at least one selected from the group consisting of $Li_2CO_3$, LiOH, $LiNO_3$, $CH_3COOLi$ and $Li_2(COO)_2$, and specifically, the lithium source material may be $Li_2CO_3$ or LiOH.

The heat treatment may be performed at 600 to 1100 degrees Celsius, and may be performed for 5 to 12 hours, similarly to the above-mentioned first production method.

Another embodiment of the invention provides a positive electrode in which a positive electrode mixture containing the positive electrode active material is formed on a current collector.

The positive electrode mixture may further include a conductive material and a binder in addition to the positive electrode active material.

Specifically, the positive electrode can be produced, for example, by coating a positive electrode slurry in which a positive electrode active material, a conductive material and a binder are mixed in a positive electrode current collector, and then drying and pressing the slurry.

The positive electrode current collector is generally manufactured to have a thickness of 3 to 500 µm. Such positive electrode current collector is not particularly limited as long as it has high conductivity without inducing any chemical change in the battery. For example, any one selected from the group consisting of stainless steel, aluminum, nickel, titanium, a surface treated material of aluminum or stainless steel with carbon, nickel, titanium or silver may be used, and specifically, aluminum may be used. The current collector may form fine irregularities on its surface to increase the adhesion strength of the positive electrode active material, and it may be used in various shapes such as a film, a sheet, a foil, a net, a porous body, a foam, a non-woven fabric, and the like.

The positive electrode active material may, for example, in addition to the above-mentioned positive electrode active material particles, further include layered compounds such as lithium nickel oxide ($LiNiO_2$) or compounds substituted with one or more transition metals; lithium manganese oxides such as the formulas $Li_{1+x}Mn_{2-x}O_4$ (wherein, x is 0 to 0.33), $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides represented by the formula $LiNi_{1-x}M_xO_2$ (wherein, M=Co, Mn, Al, Cu, Fe, Mg, B or Ga, x=0.01 to 0.3); lithium manganese composite oxides represented by the formula $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn); $LiMn_2O_4$ where some of Li atoms in the formula are substituted with alkaline earth metal ions; disulfide compounds; $Fe_2(MoO_4)_3$; and the like, but are not limited thereto. Of course, positive electrode active material may be composed of only the positive electrode active material according to the present invention, and the positive electrode active material according to the present invention may include at least 80% by weight or more.

The conductive material is generally added in an amount of 0.1 to 30% by weight based on the total weight of the mixture containing the positive electrode active material. The conductive material is not particularly limited as long as it has conductivity without inducing any chemical change in the battery. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive material.

The binder is a component that assists in bonding between the active material and the conductive agent or the like and bonding to the current collector, and is usually added in an amount of 0.1 to 30% by weight based on the total weight of the mixture containing the positive electrode active material. Examples of these binders include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The positive electrode may be used for a positive electrode for lithium secondary batteries, and the lithium secondary battery comprises the positive electrode, a negative electrode, a separator, and a non-aqueous electrolyte containing a lithium salt.

Hereinafter, other configurations of the lithium secondary battery will be described.

The negative electrode is manufactured by coating a negative electrode active material onto a negative electrode current collector and drying it, and if necessary, the components contained in the positive electrode described above can be optionally further included.

The negative electrode current collector is generally manufactured to have a thickness of 3 to 500 μm. Such negative electrode current collector is not particularly limited as long as it has conductivity without inducing any chemical change in the battery. For example, copper, stainless steel, aluminum, nickel, titanium, calcined carbon, a surface treated material of copper or stainless steel with carbon, nickel, titanium, silver or the like, an aluminum-cadmium alloy, etc. may be used. Further, similarly to the positive electrode current collector, the negative electrode current collector may form fine irregularities on its surface to increase the adhesion strength of the negative electrode active material, and it can be used in various shapes such as such as a film, a sheet, a foil, a net, a porous body, a foamed body, a non-woven fabric, etc.

Examples of the negative electrode active material include carbon such as hardly graphitizable carbon and graphite-based carbon; metal composite oxides such as $Li_xFe_2O_3$ ($0 \leq x \leq 1$), $Li_xWO_2$ ($0 \leq x \leq 1$), $Sn_xMe_{1-x}Me_y'O_z$ (Me: Mn, Fe, Pb, Ge; Me': Al, B, P, Si, Group I, II and III elements, halogen; $0 < x \leq 1$; $1 \leq y \leq 3$; $1 \leq z \leq 8$); lithium metals; lithium alloys; silicon-based alloys; tin-based alloys; metal oxides such as SnO, SnO2, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; and the like.

The separator is interposed between the positive electrode and the negative electrode, and an insulating thin film having high ion permeability and mechanical strength is used. A pore diameter of the separator is generally 0.01 to 10 μm, and a thickness thereof is generally 5 to 300 μm. For example, there may be used olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but is not limited thereto.

As examples of the non-aqueous organic solvent, there may be mentioned non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. If necessary, in order to impart incombustibility, the electrolyte may further include halogen-containing solvents, such as carbon tetrachloride and ethylene trifluoride. Furthermore, in order to improve high-temperature storage characteristics, the electrolyte may further include carbon dioxide gas, and may further include fluoro-ethylene carbonate(FEC), propene sultone(PRS), etc.

DETAILED DESCRIPTION OF THE EMBODIMENTS

Hereinafter, the present invention will be described in further detail with reference to the following examples. However, the following examples are for illustrative purposes only and are not intended to limit the scope of the present invention.

Preparation Example 1

A precursor was synthesized so that the molar ratio of Ni, Mn, and Co was 20:20:60, and then mixed with Li$_2$CO$_3$ so that the molar ratio of Li:(Ni+Mn+Co) became 1.28:1. The mixture was then calcinated in a furnace at 940° C. for 10 hours to prepare Li$_{1.14}$Ni$_{0.17}$Co$_{0.17}$Mn$_{0.52}$O$_2$.

Preparation Example 2

A precursor was synthesized so that the molar ratio of Ni, Co and Mn was 12:12:76, and then mixed with Li$_2$CO$_3$ so that the molar ratio of Li:(Ni+Mn+Co) became 1.3:1. The mixture was then calcinated in a furnace at 940° C. for 10 hours to prepare Li$_{1.15}$Ni$_{0.1}$CO$_{0.1}$Mn$_{0.65}$O$_2$.

Preparation Example 3

A precursor was synthesized so that the molar ratio of Ni, Co and Mn was 11:11:78, and then mixed with Li$_2$CO$_3$ so that the molar ratio of Li:(Ni+Mn+Co) became 1.2:1. The mixture was then calcinated in a furnace at 940° C. for 10 hours to prepare Li$_{1.1}$Ni$_{0.1}$CO$_{0.1}$Mn$_{0.7}$O$_2$.

Example 1

Li$_{1.14}$Ni$_{0.17}$Co$_{0.17}$Mn$_{0.52}$O$_2$ and Li$_{0.9}$Ni$_{0.3}$Co$_{0.2}$Mn$_{0.5}$O$_2$ were mixed in a weight ratio of 96:4 by using a ball mill, and the mixture was calcinated in a furnace at 800° C. for 10 hours to form a coating layer having a thickness of 60 nm, thereby producing a positive electrode active material.

Figure 1:
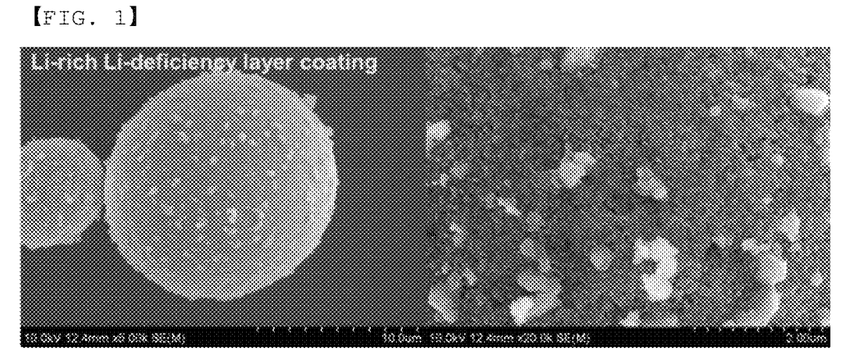
FIG. 1 is an SEM photograph of a positive electrode active material according to Example 1.

The SEM photograph of the synthesized positive electrode active material is shown in FIG. 1.

Figure 2:
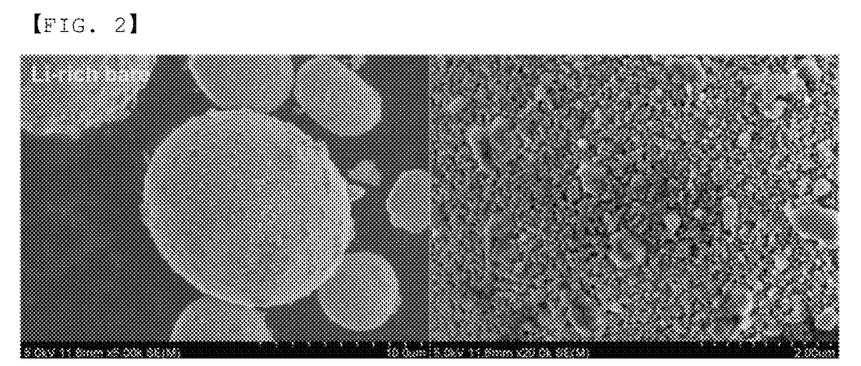
FIG. 2 is an SEM photograph of the positive electrode active material according to Comparative Example 1.

Referring to FIG. 1, it can be confirmed that in the positive electrode active material according to Example 1, the space between particles is filled as compared with the positive electrode active material according to Comparative Example 1 shown in FIG. 2. It can be seen that as the space between particles is filled in this way, the roughness of the surface of the active material is greatly reduced, and that the positive electrode active material according to Example 1 forms a smooth surface compared to the positive electrode active material according to Comparative Example 1.

Example 2

A positive electrode active material was produced in the same manner as in Example 1, except that Li$_{1.14}$Ni$_{0.17}$Co$_{0.17}$Mn$_{0.52}$O$_2$ and Li$_{0.9}$Ni$_{0.3}$Co$_{0.2}$Mn$_{0.5}$O$_2$ were mixed in a weight ratio of 92:8 by using a ball mill to form a coating layer having a thickness of 120 nm.

Example 3

A positive electrode active material was produced in the same manner as in Example 1, except that Li$_{1.15}$Ni$_{0.1}$CO$_{0.1}$Mn$_{0.65}$O$_2$ prepared in Preparation Example 2 and Li$_{0.9}$Ni$_{0.3}$Co$_{0.2}$Mn$_{0.5}$O$_2$ were mixed in a weight ratio of 96:4 by using a ball mill.

Example 4

A positive electrode active material was produced in the same manner as in Example 1, except that Li$_{1.15}$Ni$_{0.1}$CO$_{0.1}$Mn$_{0.65}$O$_2$ prepared in Preparation Example 3 and Li$_{0.9}$Ni$_{0.3}$Co$_{0.2}$Mn$_{0.5}$O$_2$ were mixed in a weight ratio of 96:4 by using a ball mill.

Comparative Example 1

Li$_{1.14}$Ni$_{0.17}$Co$_{0.17}$Mn$_{0.52}$O$_2$ was prepared as a positive electrode active material.

Comparative Example 2

A positive electrode active material was produced in the same manner as in Example 1, except that Li$_{1.14}$Ni$_{0.17}$Co$_{0.17}$Mn$_{0.52}$O$_2$ and Li$_{0.9}$Ni$_{0.3}$Co$_{0.2}$Mn$_{0.5}$O$_2$ were mixed in a weight ratio of 88:12 by using a ball mill to form a coating layer having a thickness of 180 nm.

Comparative Example 3

A positive electrode active material was produced in the same manner as in Example 1, except that Li$_{1.14}$Ni$_{0.17}$Co$_{0.17}$Mn$_{0.52}$O$_2$ and LiNi$_{0.6}$Co$_{0.4}$O$_2$ were mixed in a weight ratio of 96:4 by using a ball mill to form a coating layer having a thickness of 60 nm.

Comparative Example 4

A positive electrode active material was produced in the same manner as in Example 1, except that $Li_{1.14}Ni_{0.17}Co_{0.17}Mn_{0.52}O_2$ and $Li_{0.9}CoO_2$ were mixed in a weight ratio of 96:4 by using a ball mill to form a coating layer having a thickness of 60 nm.

Experimental Example 1

Figure 3:
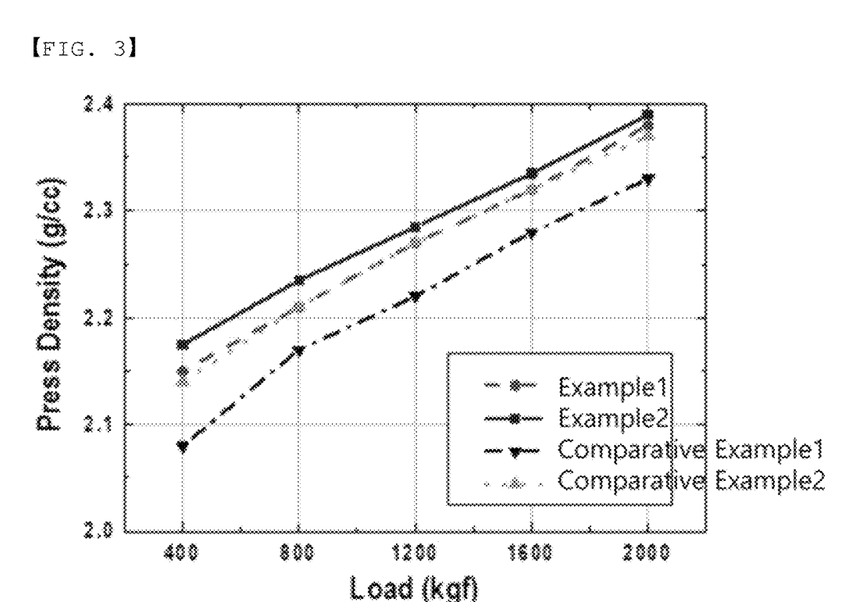
FIG. 3 is a comparative graph showing the press density according to Experimental Example 1.

The powder press density was measured for each of the positive electrode active materials prepared in Examples 1 and 2 and Comparative Examples 1 and 2, and the results are shown in FIG. 3.

Referring to FIG. 3, it can be confirmed that when a coating layer is formed according to the present invention, the press density is improved. It can also be confirmed that with respect to a coating amount exceeding a certain amount, the press density starts to decrease again. This indicates that there is an optimum condition for the improvement of the press density in the content of coating. It is expected that when the amount of coating exceeding a fixed amount is applied, the press density will start to decrease.

Reference Example 1

A positive electrode active material was produced in the same manner as in Example 1, except that $LiNi_{0.33}Co_{0.33}Mn_{0.33}O_2$ and $Li_{0.9}Ni_{0.3}Co_{0.2}Mn_{0.5}O_2$ were mixed in a weight ratio of 96:4 by using a ball mill.

Reference Example 2

A positive electrode active material was produced in the same manner as in Example 1, except that $LiNi_{0.33}Co_{0.33}Mn_{0.33}O_2$ and $Li_{0.9}Ni_{0.3}Co_{0.2}Mn_{0.5}O_2$ were mixed in a weight ratio of 96:4 by using a ball mill.

Reference Experimental Example

Figure 4:
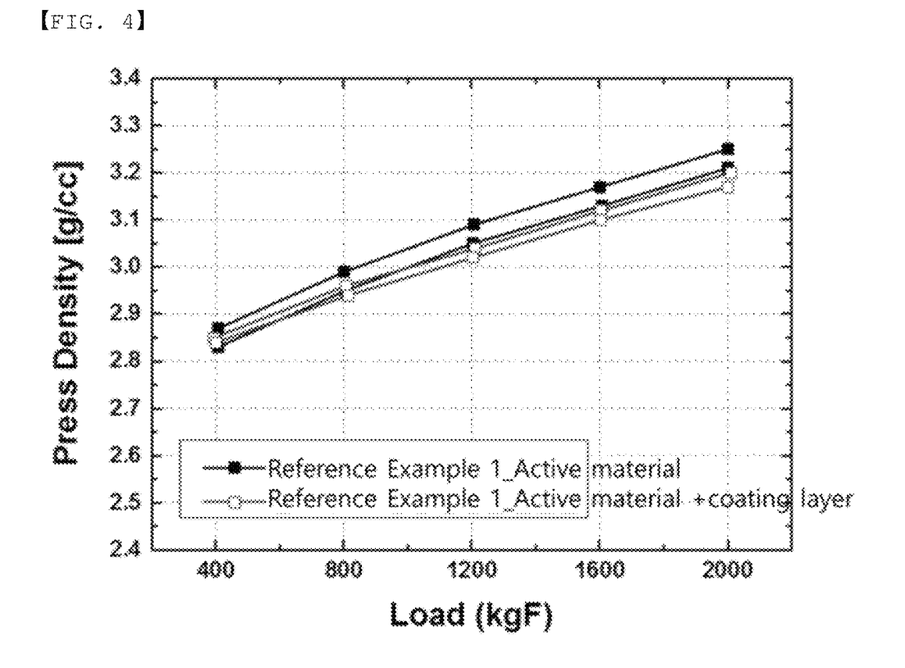
FIGS. 4 and 5 are graphs comparing press densities according to Reference Example.
Figure 5:
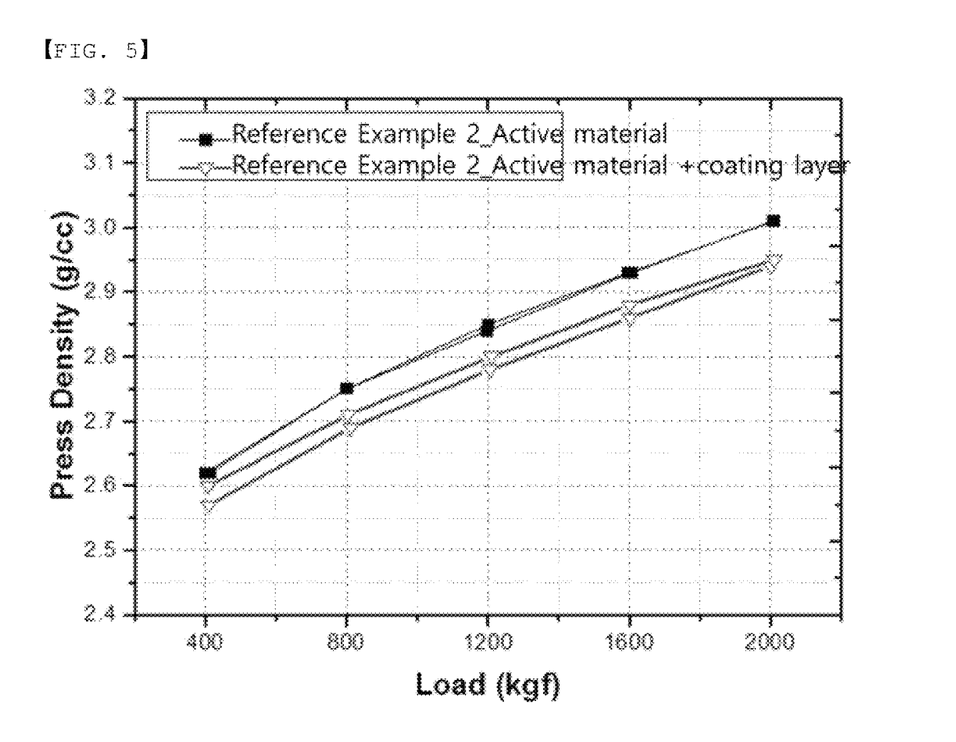

In order to confirm the change in press densities when only $LiNi_{0.33}Co_{0.33}Mn_{0.33}O_2$ of Reference Example 1 is used as a positive electrode active material, and when used as the positive electrode active material on which the coating layer of Reference Example 1 was formed, and the change in press densities when only $LiNi_{0.5}Co_{0.2}Mn_{0.3}O_2$ of Reference Example 2 is used as a positive electrode active material, and when used as the positive electrode active material on which the coating layer of Reference Example 2 was formed, the powder press densities were confirmed in the same manner as in Experimental Example 1 by using the positive electrode active materials, and the results are shown in FIGS. 4 and 5.

Referring to FIGS. 4 and 5, it can be confirmed that in the case of using the lithium transition metal oxide having the compositions of Reference Examples 1 and 2, the press densities are rather reduced by the formation of the coating layer. This is because, originally, the lithium transition metal oxide having the above composition has a high press density, whereas when the BET is lower than that of the lithium-rich lithium manganese-based oxide of the present invention and thus a coating layer is additionally formed, the homogeneity of the surface of the coating layer is rather lowered to impede pressing.

Experimental Example 2

Each of the positive electrode active materials prepared in Examples 1 to 4 and Comparative Examples 1 to 4 was used, and PVdF as a binder and Super-P as a conductive material were used. The positive electrode active material, the binder and the conductive material were mixed well in a weight ratio of 90:5:5 in NMP, and the mixture was coated onto an Al foil having a thickness of 20 μm, dried at 130° C. and pressed so that the porosity of the electrode was 30%.

An artificial graphite was used as a negative electrode active material, and an artificial graphite conductive material (Super-P) and a binder (PVdF) were mixed in a weight ratio of 95:2.5:2.5, and the mixture was added to NMP as a solvent to prepare a negative electrode mixture slurry. The slurry was then coated on a copper foil in a thickness of 70 μm, dried and pressed at 130 degrees Celsius to produce a negative electrode.

Secondary batteries were manufactured by using the positive electrode and the negative electrode, a polyethylene membrane (Celgard, thickness: 20 μm) as a separator, and a liquid electrolyte in which $LiPF_6$ was dissolved at 1 M in a mixed solvent of ethylene carbonate, dimethylene carbonate, and diethyl carbonate in a ratio of 1:2:1.

The above secondary batteries were tested for rate characteristics in a voltage range of 2.5 V to 4.6 V, and the results are shown in Table 1 below.

TABLE 1

| | 0.1 C/0.1 C vs. 0.1 C/0.1 C | 0.5 C/0.5 C vs. 0.1 C/0.1 C | 1 C/1 C vs. 0.1 C/0.1 C |
| --- | --- | --- | --- |
| Example 1 | 100% | 92.4% | 85.5% |
| Example 2 | 100% | 92.3% | 82.3% |
| Example 3 | 100% | 92.5% | 83.4% |
| Example 4 | 100% | 92.8% | 83.1% |
| Comparative Example 1 | 100% | 92.0% | 80.5% |
| Comparative Example 2 | 100% | 91.8% | 78.1% |
| Comparative Example 3 | 100% | 92.2% | 79.8% |
| Comparative Example 4 | 100% | 89.2% | 75.2% |

Referring to Table 1, it can be confirmed that when the coating layer is formed with the content according to the present invention, a better rate characteristic is exhibited as compared with the case where no coating layer is formed (Examples 1 to 4 and Comparative Example 1). Also, referring to Examples 1 and 2 and Comparative Example 2, it can be confirmed that when too much content of the coating layer is mixed to form a coating layer, the rate characteristic is rather decreased. This is expected to be because the coating layer rather acts as a resistance.

Further, it can be confirmed that when the coating layer has the molar ratio of Li to transition metal of 1 as in Comparative Example 3, it is disadvantageous for Li diffusion due to perfect layered structure, and that when the coating layer does not contain all of Ni, Mn, and Co as in Comparative Example 4, the rate characteristic is reduced because a metal oxide phase which may impede the movement of lithium ions as much as Li is deficient may be formed.

While the present invention has been shown and described with reference to exemplary embodiments thereof, it will be understood by those skilled in the art that various applications and modifications can be made within the scope of the present invention based on the contents described above.

INDUSTRIAL APPLICABILITY

As described above, the positive electrode active material according to the present invention includes the lithium-rich lithium manganese-based oxide (having a composition of Mn of 0.5 or more) in which a coating layer containing a lithium-deficient transition metal oxide in a lithium-deficient state having a molar ratio of lithium to transition metal of less than 1 is formed on the surface, whereby not only the press density can be improved through the reduction of the surface roughness, but also the electrical conductivity is improved by the coating of the lithium-deficient transition metal oxide based on the composition of Ni, Mn, and Co, and the lithium ion diffusion characteristic is improved according to the lithium deficiency, and therefore, the charge/discharge rate characteristic of the secondary battery including the same is improved.

In addition, since the coating layer can also serve as an active material, the decrease in mass of the active material due to the increase in the mass of the coating layer is lower than that of the existing coating configuration, and the capacity decrease can be prevented.

The invention claimed is:

1. A positive electrode active material comprising:
a lithium-rich lithium manganese-based oxide, and
a coating layer formed on a surface of the lithium-rich lithium manganese-based oxide,
wherein the lithium-rich lithium manganese-based oxide is represented by the following chemical formula (1), $$Li_{1+a}Ni_xCo_yMn_zM_vO_{2-b}A_b \quad (1)$$

wherein, $0<a\leq0.2$, $0<x\leq0.4$, $0<y\leq0.4$, $0.5\leq z\leq0.9$, $0\leq v\leq0.2$, $a+x+y+z+v=1$, and $0\leq b\leq0.5$;
M is one or more elements selected from the group consisting of Al, Zr, Zn, Ti, Mg, Ga, In, Ru, Nb, and Sn; and
A is one or more elements selected from the group consisting of P, N, F, S and Cl;
wherein the coating layer contains a lithium-deficient transition metal oxide in a lithium-deficient state having a molar ratio of lithium to transition metal of less than 1, wherein the lithium-deficient transition metal oxide is represented by the following chemical formula (2), $$Li_{a'}MeO_2 \quad (2)$$

wherein, $0<a'<1$,
Me is $Ni_{x'}Co_{y'}Mn_{z'}$, wherein, $0<x'\leq1$, $0<y'\leq1$, $0<z'\leq1$, and $x'+y'+z'=1$, and
wherein a content of the coating layer is 1% to 10% by weight based on a total weight of the positive electrode active material.

2. The positive electrode active material according to claim 1, wherein $0<x'\leq0.7$, $0<y'\leq0.7$, and $0.2<z'\leq0.6$.

3. The positive electrode active material according to claim 1, wherein a molar ratio of lithium to transition metal in the lithium-deficient transition metal oxide is 0.5 to 0.9.

4. The positive electrode active material according to claim 1, wherein a thickness of the coating layer is 30 nm to 200 nm.

5. A method for producing the positive electrode active material of claim 1, comprising:
(i) mixing a lithium-rich transition metal oxide and a lithium-deficient transition metal oxide in a lithium-deficient state having a molar ratio of lithium to transition metal of less than 1 to form a mixture; and
(ii) heat treating the mixture);
wherein the lithium-deficient transition metal oxide is mixed so as to contained in an amount of 1% to 10% by weight based on the total weight of the lithium-rich lithium manganese-based oxide and the lithium-deficient transition metal oxide.

6. The method for producing the positive electrode active material according to claim 5, wherein the mixing is a dry mixing.

7. The method for producing the positive electrode active material according to claim 5, wherein the heat treating is performed at 600 to 1100 degrees Celsius.

8. A positive electrode comprising a positive electrode mixture comprising the positive electrode active material according to claim 1 formed on a current collector.

9. A secondary battery comprising the positive electrode according to claim 8.

* * * * *